United States Patent
Sattiraju et al.

(10) Patent No.: US 11,128,541 B2
(45) Date of Patent: Sep. 21, 2021

(54) EVALUATING THE IMPACT OF TRANSCEIVER TEMPERATURE ON INTERFACE UTILIZATION

(71) Applicant: Cisco Technology, inc., San Jose, CA (US)

(72) Inventors: Srinivas Siva Kanth Sattiraju, Alameda, CA (US); Suvil Singh Deora, Bellevue, WA (US); Shyam Kapadia, San Jose, CA (US); Naoshad Mehta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/517,742

(22) Filed: Jul. 22, 2019

(65) Prior Publication Data

US 2021/0028994 A1    Jan. 28, 2021

(51) Int. Cl.
*H04L 12/24* (2006.01)
*H04L 12/26* (2006.01)
(Continued)

(52) U.S. Cl.
CPC ........ *H04L 41/147* (2013.01); *H04L 41/0659* (2013.01); *H04L 41/16* (2013.01);
(Continued)

(58) Field of Classification Search
CPC . H04L 41/147; H04L 41/0659; H04L 47/127; H04L 47/122; H04L 43/0876;
(Continued)

(56) References Cited

U.S. PATENT DOCUMENTS 7,457,725 B1 * 11/2008 Civilini ................. G06F 11/008
                                                                    702/181
9,838,317 B1 * 12/2017 Yadav ................. H04L 43/0829
(Continued)

FOREIGN PATENT DOCUMENTS

| CN | 101046501 | 10/2007 |
|----|-----------|---------|
| CN | 101344439 | 1/2009  |
| CN | 103886374 | 6/2014  |

OTHER PUBLICATIONS

"K-nearest neighbors algorithm", online: https://en.wikipedia.org/wiki/K-nearest_neighbors_algorithm, dated Oct. 8, 2019, printed Nov. 6, 2019, 10 pages, Wikimedia Foundation Inc.
(Continued)

*Primary Examiner* — Aaron N Strange
(74) *Attorney, Agent, or Firm* — Behmke Innovation Group LLC; Kenneth J. Heywood; Jonathon P. Western

(57) ABSTRACT

In one embodiment, a device obtains temperature and utilization measurements for a set of network interface transceivers in a network. The device computes, for each of the transceivers, a correlation coefficient between its temperature and utilization measurements. The device applies a k-nearest neighbor classifier to the correlation coefficients, to predict a correlation coefficient. The device uses the predicted correlation coefficient to determine an impact of temperature on utilization of a particular network interface transceiver. The device initiates a mitigation action, when the determined impact of temperature on the utilization of the particular network interface transceiver exceeds a predefined threshold.

20 Claims, 7 Drawing Sheets

(51) Int. Cl.
*H04L 12/803* (2013.01)
*H04L 12/801* (2013.01)

(52) U.S. Cl.
CPC .......... *H04L 43/0876* (2013.01); *H04L 43/16* (2013.01); *H04L 47/122* (2013.01); *H04L 47/127* (2013.01)

(58) Field of Classification Search
CPC ......... H04L 43/16; H04L 41/16; H04L 47/10; H04L 47/12; H04L 49/50; H04L 49/501; H04L 41/06; H04L 41/0654; H04L 41/0896; G06F 11/3058
See application file for complete search history.

(56) References Cited

U.S. PATENT DOCUMENTS

| | | | | |
|---|---|---|---|---|
| 10,346,239 | B1* | 7/2019 | Ortega Gutierrez | G06F 11/07 |
| 10,686,695 | B1* | 6/2020 | Nainar | H04L 45/28 |
| 2005/0090911 | A1* | 4/2005 | Ingargiola | G06Q 40/00 |
| | | | | 700/36 |
| 2007/0118546 | A1* | 5/2007 | Acharya | G06F 16/9535 |
| 2008/0040302 | A1* | 2/2008 | Perrizo | G06K 9/6276 |
| | | | | 706/20 |
| 2012/0195195 | A1* | 8/2012 | Rai | H04L 47/122 |
| | | | | 370/235 |
| 2013/0286846 | A1* | 10/2013 | Atlas | H04L 47/726 |
| | | | | 370/236 |
| 2016/0378150 | A1* | 12/2016 | Sega | G06F 11/3017 |
| | | | | 700/299 |
| 2017/0093907 | A1* | 3/2017 | Srivastava | H04L 63/1458 |
| 2017/0279666 | A1* | 9/2017 | Alshinnawi | H04L 41/0672 |
| 2018/0060752 | A1* | 3/2018 | Gross | G06F 11/00 |
| 2018/0324198 | A1* | 11/2018 | Borthakur | G06F 8/61 |
| 2019/0182120 | A1* | 6/2019 | Coccia | G06Q 10/06 |
| 2019/0238400 | A1* | 8/2019 | Yang | H04L 41/069 |

OTHER PUBLICATIONS

"Statistical population", online: https://en.wikipedia.org/wiki/Statistical_population, dated Sep. 25, 2019, printed Nov. 7, 2019, 2 pages, Wikimedia Foundation Inc.

"Covariance", online: https://en.wikipedia.org/wiki/Covariance, dated Oct. 31, 2019, printed Nov. 7, 2019, 6 pages, Wikimedia Foundation Inc.

"Standard deviation", online: https://en.wikipedia.org/wiki/Standard_deviation, dated Oct. 31, 2019, printed Nov. 7, 2019, 6 pages, Wikimedia Foundation Inc.

Cacciatore, Stefano, "KNN Prediction Routine Using Pre-Calculated Distances", https://www.rdocumentation.org/packages/KODAMA/versions/0.0.1/topics/knn.predict, KODAMA v0.0.1, RDocumentation, printed Jun. 28, 2019, 1 page.

"Pearson correlation coefficient", online: https://en.wikipedia.org/w/index.php?title=Pearson_correlation_coefficient&oldid=868914426, dated Nov. 15, 2018, printed Nov. 15, 2018, 9 pages, Wikimedia Foundation Inc.

* cited by examiner

US 11,128,541 B2

EVALUATING THE IMPACT OF TRANSCEIVER TEMPERATURE ON INTERFACE UTILIZATION

TECHNICAL FIELD

The present disclosure relates generally to computer networks, and, more particularly, to evaluating the impact of transceiver temperature on interface utilization.

BACKGROUND

Various types of interfaces of networking devices typically have a very wide range of operating temperatures. For example, the standard operating temperature range of an optical transceiver of a device may range between −5° C. and 75° C. This is a considerably large window where problems can arise, well before any major alarms are raised. Indeed, temperature alarms are typically threshold-based, meaning that an alarm is raised only when the operating temperature crosses a predefined threshold (e.g., the temperature increases to 76° C.). However, there is no guarantee that the operation of the device will not be impinged, prior to crossing the threshold. Indeed, such an approach fails to take into account the actual utilization of the interface at all.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
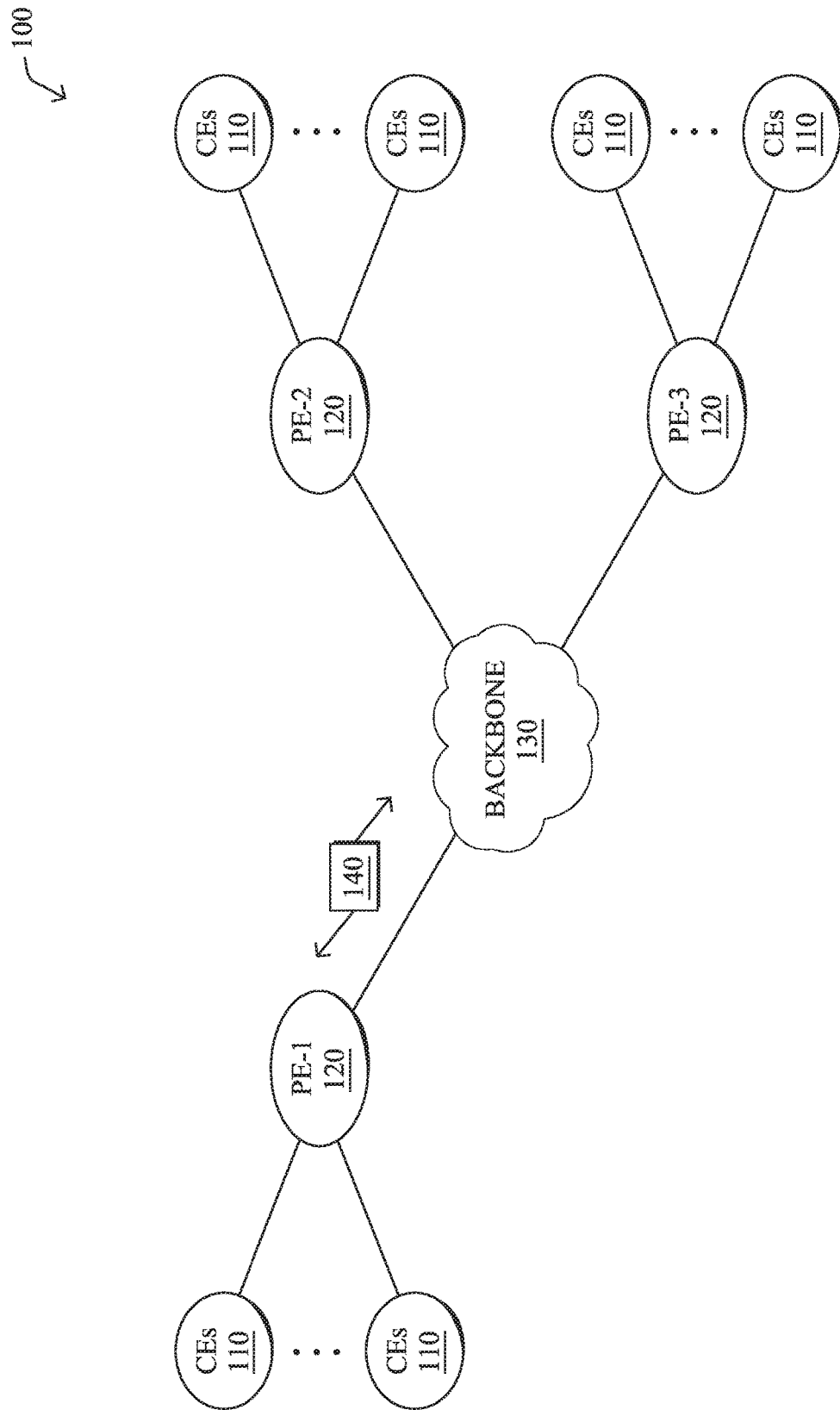
FIGS. 1A-1B illustrate an example communication network.

According to one or more embodiments of the disclosure, a device obtains temperature and utilization measurements for a set of network interface transceivers in a network. The device computes, for each of the transceivers, a correlation coefficient between its temperature and utilization measurements. The device applies a k-nearest neighbor classifier to the correlation coefficients, to predict a correlation coefficient. The device uses the predicted correlation coefficient to determine an impact of temperature on utilization of a particular network interface transceiver. The device initiates a mitigation action, when the determined impact of temperature on the utilization of the particular network interface transceiver exceeds a predefined threshold.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using a single CE router with two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
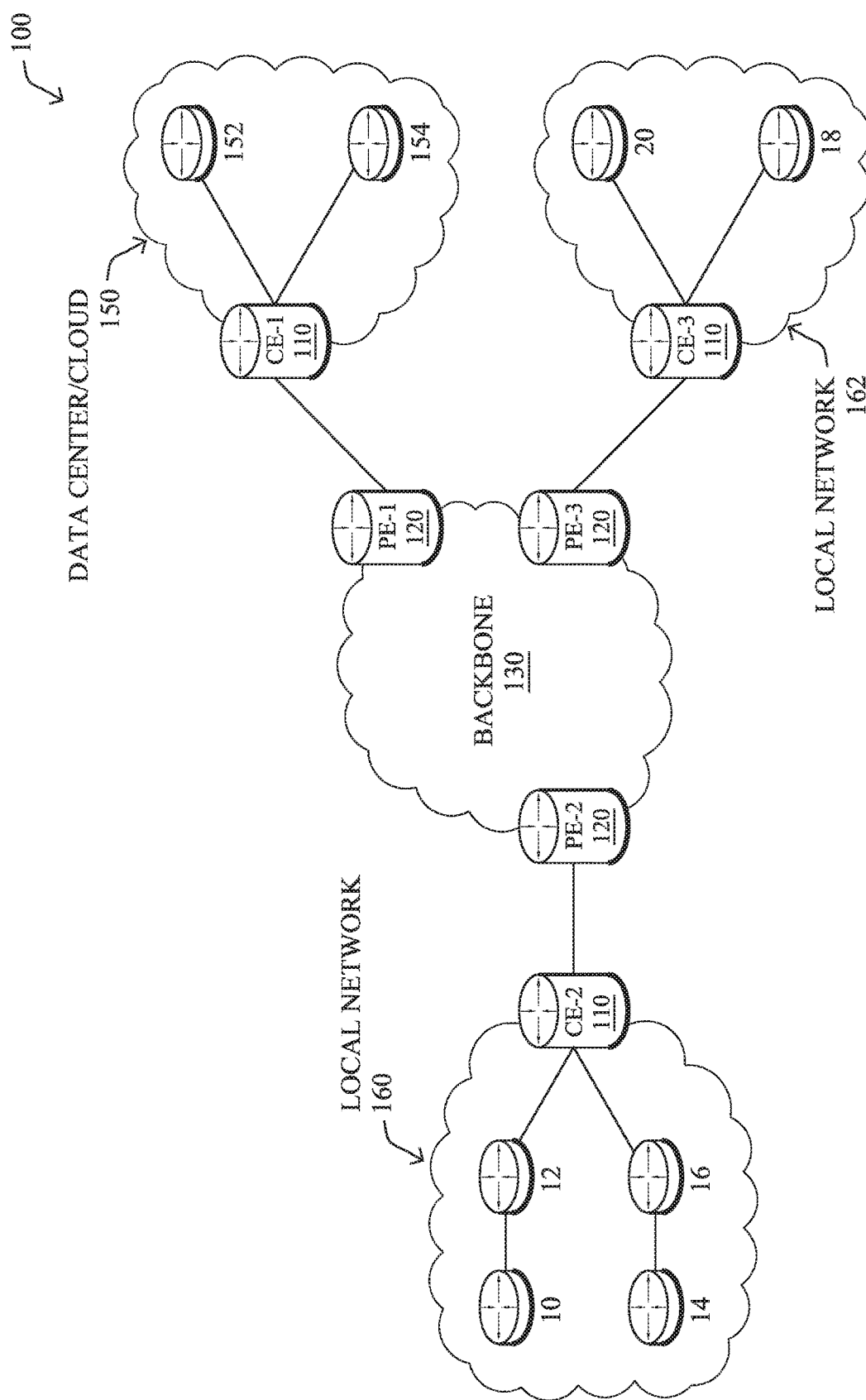

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
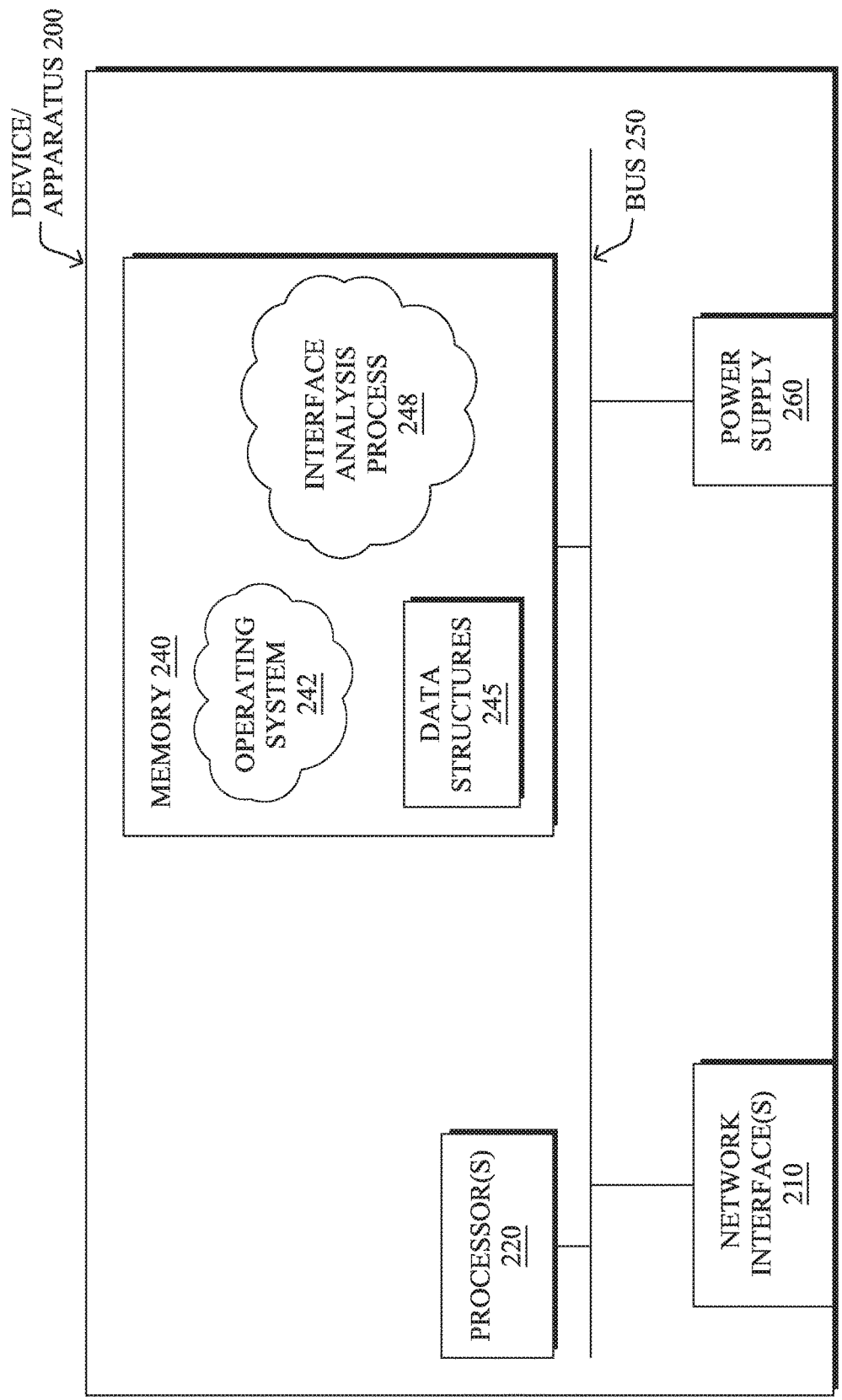
FIG. 2 illustrates an example network device/node.

FIG. 2 is a schematic block diagram of an example device/apparatus 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), or any other computing device that supports the operations of network 100 (e.g., switches, firewalls, storage devices, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art. For example, network interface 210 may comprise an optical transceiver, a wireless transceiver (e.g., Wi-Fi, cellular, Bluetooth, etc.), or a wired transceiver (e.g., Ethernet, etc.), to communicate with a network.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an interface analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, many networking devices monitor the temperature of their network interfaces, to ensure that the operating temperature falls with a predefined range. For example, device 200 may monitor the temperature of its network interface(s) 210 and compare the resulting temperature measurements to one or more temperature thresholds. If the measured temperature exceeds such a threshold, the device may then raise an alarm/alert, so that a technician can initiate corrective measures.

The defined operating temperature ranges for network interfaces are often very large. For example, a typical optical interface has an operating temperature range of −5° C. and 75° C. Thus, if the temperature of the interface exceeds either threshold (e.g., drops to −6° C. or increases to 76° C.), the device may raise an alarm. However, this is quite a large window where things can go wrong, well before a temperature alarm is raised.

A key observation herein is that interface utilization measurements of a device often vary with the temperature changes of its interface, even within the acceptable temperature range of the device. Such an assessment may, for example, aid in the planning of device designs, such as the placement of the transceiver of a network interface relative to a processor of the device (e.g., its primary CPU, an ASIC of the interface, etc.). Accordingly, there is a glaring lack of the following functions in modern networking devices:

1. In-Range Temperature Assessment—Modern networking devices lack any form of empirical analysis on interface utilization trends at varying temperatures. This type of assessment may help a user understand the potential impact on the device, before it is too late.
2. Device-Specific Behavioral Analysis—Another issue with using catchall temperature alarm thresholds is that they do not take into account the specific behaviors of the device. Indeed, every data center site is different and will have its own cooling mechanisms. This means that device behaviors can vary considerably across deployment environments. In addition, there is no true behavioral symmetry between two devices, even within the same deployment environment. This means that it is possible that two interface transceivers located at different points within the same data center could still exhibit very different behaviors. The correlation between devices that are physical peers (e.g., on the same rack in a data center) also plays a role here, which is not currently captured or modeled.

Evaluating the Impact of Transceiver Temperature on Interface Utilization

The techniques herein allow for the evaluation of the impact of transceiver temperature of a network interface on the utilization of the interface. Indeed, testing has shown that the temperature of a transceiver appears to have a direct correlation with its utilization. In some aspects, the techniques herein leverage machine learning, such as a k-nearest neighbor (KNN) algorithm, to model this relationship. In further aspects, a feedback mechanism is introduced that can allow preemptive measures to be taken, such as diverting traffic away from the affected interface, prior to an issue arising, while still maintaining all forwarding correctness.

Specifically, according to one or more embodiments of the disclosure as described in detail below, a device obtains temperature and utilization measurements for a set of network interface transceivers in a network. The device computes, for each of the transceivers, a correlation coefficient between its temperature and utilization measurements. The device applies a k-nearest neighbor classifier to the correlation coefficients, to predict a correlation coefficient. The device uses the predicted correlation coefficient to determine an impact of temperature on utilization of a particular network interface transceiver. The device initiates a mitigation action, when the determined impact of temperature on the utilization of the particular network interface transceiver exceeds a predefined threshold.

Illustratively, the techniques described herein may be performed by hardware, software, and/or firmware, such as in accordance with the interface analysis process 248, which may include computer executable instructions executed by the processor 220 (or independent processor of interfaces 210) to perform functions relating to the techniques described herein.

Operationally, and referring again to FIG. 2, interface analysis process 248 may leverage machine learning, to assess the relationship between the temperature of a network interface 210 or, more specifically, its transceiver, and the utilization of that interface. In general, machine learning is concerned with the design and the development of techniques that receive empirical data as input (e.g., measurement data regarding the interface 210 under scrutiny) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as different observed temperatures or utilization measurements. Often, M is a statistical model, and the cost function is inversely proportional to the likelihood of M, given the input data.

In various embodiments, interface analysis process 248 may employ one or more supervised, unsupervised, or semi-supervised machine learning models. Generally, supervised learning entails the use of a training set of data that is used to train the model to apply labels to the input data. For example, the training data may include sample measurements that are labeled as "Problematic" or "Normal." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, unsupervised learning can be used to identify interfaces that behave similarly to one another, based on their captured measurements. Semi-supervised learning models take a middle ground approach that uses a greatly reduced set of labeled training data.

Example machine learning techniques that interface analysis process 248 can employ may include, but are not limited to, nearest neighbor (NN) techniques (e.g., KNN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly flagged a behavior as problematic, when it is not. Conversely, the false negatives of the model may refer to the number of times the model incorrectly classified the behavior as normal, when it was actually problematic. True negatives and positives may refer to the number of times the model correctly identified normal or problematic behavior, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
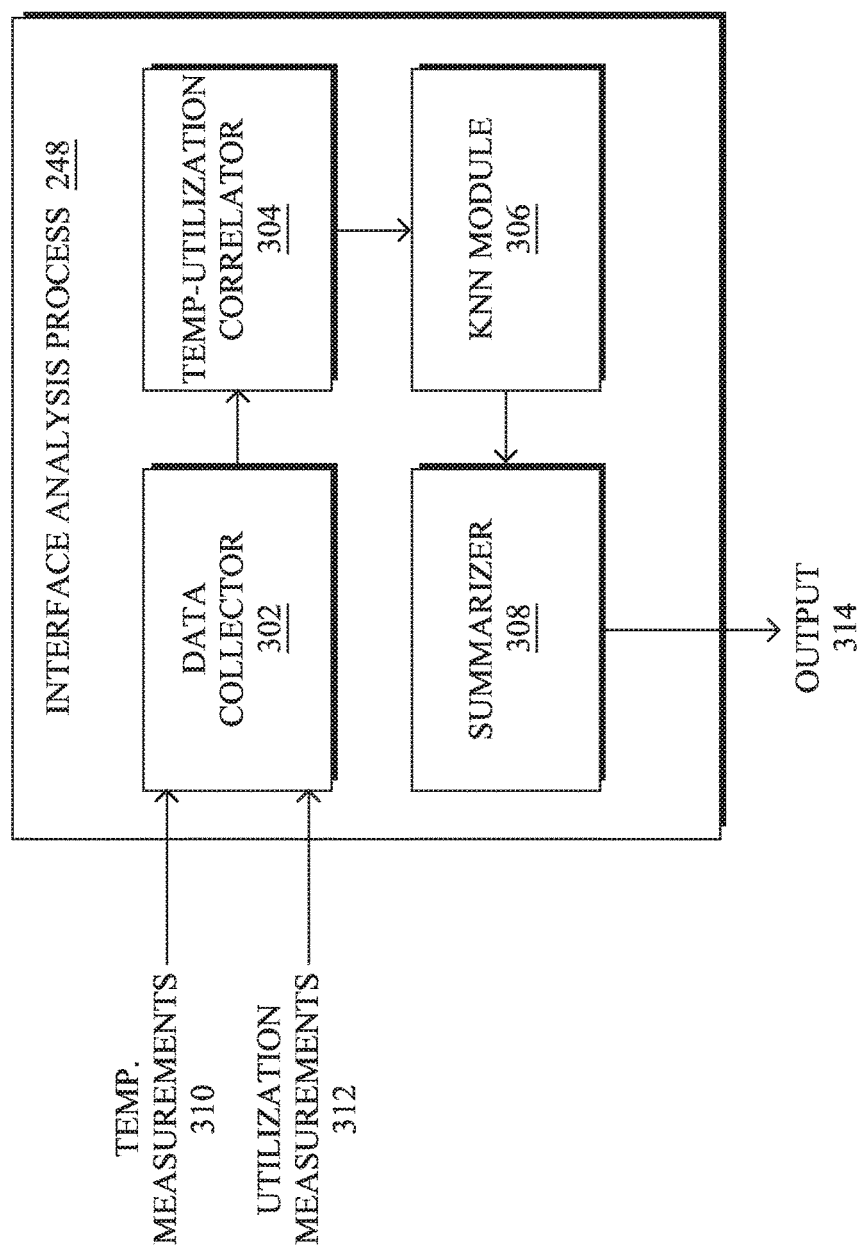
FIG. 3 illustrates an example architecture for evaluating the impact of transceiver temperature on interface utilization.

FIG. 3 illustrates an example architecture 300 for evaluating the impact of transceiver temperature on interface utilization, according to various embodiments. At the core of architecture 300 is interface analysis process 248 which may include any or all of the following components: a data collector 302, a temperature (temp)-utilization correlator 304, a KNN module 306, and/or a summarizer 308. In various embodiments, these components may be executed directly on the networking device under scrutiny or, alternatively, by another device in communication therewith. In further cases, these components may be implemented in a distributed manner across any number of devices. In such cases, these devices may be viewed as a singular device/system, for purposes of executing interface analysis process 248. Moreover, while components 302-308 are shown, their functionalities can be combined or omitted, as desired, in various embodiments.

In various embodiments, data collector 302 of interface analysis process 248 may obtain temperature measurements 310 and utilization measurements 312 from one or more network interfaces/transceivers of one or more devices in a network. In some cases, data collector 302 may retrieve measurements 310 and/or 312 on a pull basis, meaning that data collector 302 first sends a request for the data. In other cases, data collector 302 may receive measurements 310 and/or 312 on a push basis, meaning that measurements 310 and/or 312 are provided to data collector 302 without data collector 302 first requesting the data. In addition, the cadence at which the data is provided to data collector 302 can be controlled, in some cases, as desired.

By way of example, utilization measurements 312 may comprise Digital Optical Monitoring (DOM) statistics, if the interface under scrutiny is an optical interface, or any other form of usage measurements for the interface/transceiver. For example, measurements 312 may indicate the number of bytes transmitted and/or received by the interface/transceiver during a given sampling period. Similarly, temperature measurements 310 may comprise measurements taken at the start of the sample period, at the midpoint of the sample period, the end of the sample period, or an average of any number of measurements during the sample period. In other cases, the measurements may simply be taken as singular values at predefined times. Once obtained, data collector 302 may build a historical database of temperature measurements 312 and utilization measurements 312 for the interface(s), for use by the other components 304-308 of interface analysis process 248.

More specifically, in various embodiments, temperature measurements 310 may comprise any or all of the following parameters:

High Alarm Value—e.g., the high-end temperature threshold used by the device to raise a temperature alarm.

Minimum Value—e.g., the lowest temperature measurement taken for the interface/transceiver during a sampling period.

Temperature Units—e.g., Celsius or Fahrenheit

Max Value—e.g., the highest temperature measurement taken for the interface/transceiver during a sampling period.

Low Alarm Value—e.g., the low-end temperature threshold used by the device to raise a temperature alarm.

Description—e.g., a description of the temperature sensor taking the measurements.

Interface ID—e.g., the name of the interface, such as "eth1/10."

Instant Value—e.g., the instantaneous temperature reading.

Sensor ID—e.g., the name of the sensor taking the measurements

Device ID—e.g., the name or other identifier of the networking device, such as "N9K-C92160YC-X-97-2004-10."

Timestamp Information

Ambient Temperature Measurements—this information can be particularly useful, for example, if there is no change in the ambient temperature, but significant variation in the temperature of the interface/transceiver.

In further embodiments, utilization data 312 may include any or all of the following for the interface/transceiver under scrutiny:

Timestamp Information
broadcastPkts
dropEvents
multicastPkts
node_id
octets
oversizePkts
pkts
rXNoErrors
rn
stormSupres sedPkts
tXNoErrors
broadcastPkts
discards
errors
multicastPkts
noBuffer
octetRate
octets
ratelnterval
ucastPkts According to various embodiments, a key aspect of the techniques herein is to correlate the diverse data sets obtained by data collector 302 and gain critical insights. Indeed, every datacenter is unique, due to the nature of its network topology, different heating/cooling frameworks, different switch types, different routing combinations, etc. In various embodiments, the techniques herein propose leveraging a KNN algorithm to assess the obtained data on a per-datacenter basis. The model representation for KNN is the entire training set, allowing interface analysis process 248 to construct a model tailored for a given datacenter.

As shown, temperature-utilization correlator 304 may assess the temperature measurements 310 and utilization measurements 312 obtained by data collector 302, to determine the relationships between these two datasets, using a correlation mechanism. More specifically, temperature-utilization correlator 304 may first identify the 'nature' of the data. In one embodiment, temperature-utilization correlator 304 may, for a given datacenter's measurement dataset, d={Y, X(util $R_x/T_x$), Time}, calculate the Pearson's correlation coefficient. In turn, temperature-utilization correlator 304 can categorize the type of correlation by considering how one variable changes relative to the other.

By way of example, consider a sample data set obtained by data collector 302 from one of the switches in a given datacenter:

TABLE 1

| Temp (in Celsius) | Utilization ($R_x$ in bytes) |
|---|---|
| 35.5 | 4503475 |
| 33.6 | 4285853 |
| 33.5 | 4482827 |
| 33 | 3947474 |
| 33.3 | 3946464 |
| 32.4 | 3747565 |
| 31.1 | 3965656 |
| 33.1 | 4012321 |
| 36.1 | 4498762 |
| 36.4 | 4766552 |
| 33.4 | 3988872 |
| 33.2 | 4077655 |
| 34.3 | 4266665 |

Figure 4:
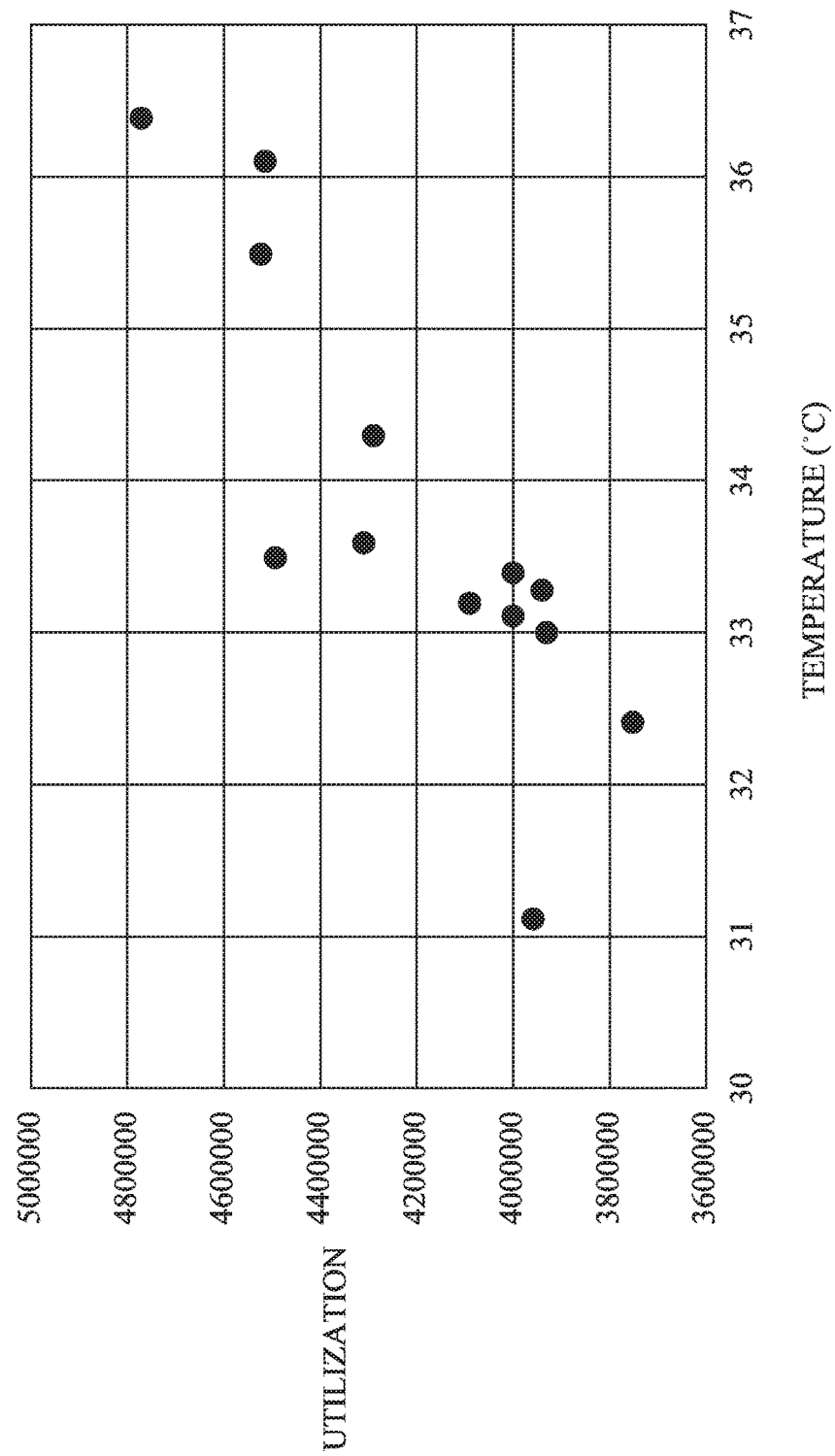
FIG. 4 illustrates an example scatter plot of transceiver utilization vs. temperature.

FIG. 4 illustrates an example scatter plot 400 using the above values. As can be seen, plot 400 suggests a definite relationship between temperature and utilization, with larger temperature values tending to be associated with larger utilization values. In other words, these two measurements appear to have a linear relationship and are positively correlated.

Referring again to FIG. 3, temperature-utilization correlator 304 may calculate the correlation between temperature measurements 310 and utilization measurements 312 such that:

Positive values denote positive linear correlation,

Negative values denote negative linear correlation,

A value of 0 denotes no linear correlation, and

The closer the value is to 1 or =1, the stronger the linear correlation.

Based on the above requirements, temperature-utilization correlator 304 may idea calculate the correlation coefficient r for the entire data set (e.g., by each row). Thus, the final dataset assessed by temperature-utilization correlator 304 may be of the form d+={y, x(util $R_x/T_x$), time, r} and temperature-utilization correlator 304 can calculate a Pearson's correlation coefficient, to determine the value of r. As would be appreciated, Pearson's correlation coefficient, when applied to a population, is commonly represented by the Greek letter ρ (rho) and may be referred to as the population correlation coefficient or the population Pearson correlation coefficient. The formula for ρ is as follows:

$$\rho_{X,Y} = \frac{\text{cov}(X, Y)}{\sigma_X \sigma_Y}$$

where coy is the covariance, σX is the standard deviation of X, and σY is the standard deviation of Y.

In various embodiments, interface analysis process 248 may also include a KNN module 306 that receives the coefficients calculated by temperature-utilization correlator 304. During execution, KNN module 306 may, given a point (y, x) to predict, compute the K most similar transceivers/interfaces and average the coefficients of the utilizations of those transceivers, to obtain the predicted r^, in one embodiment. In a further embodiment, this approach can further be tailored by transceiver make and model, where KNN module 306 may cluster the data by transceiver and repeat the KNN procedure for each cluster. In one embodiment, the modeling by KNN module 306 may only be performed when one or both forms of measurements 310-312 cross a minor, predefined threshold.

In further embodiments, interface analysis process 248 may include a summarizer 308 configured to assess and summarize the results of KNN module 306. For example, using the new r^ computed by KNN module 306, summarizer 308 may categorize the impact. Indeed, summarizer 308 may generate an output 314 that includes any or all of the following:

An alert/alarm sent to a user interface, based on the calculated impact. For example, summarizer 308 may raise an alarm if the impact is above a predefined threshold (e.g., 'high' or 'very-high'), so that an administrator can take corrective measures.

Figure 5:
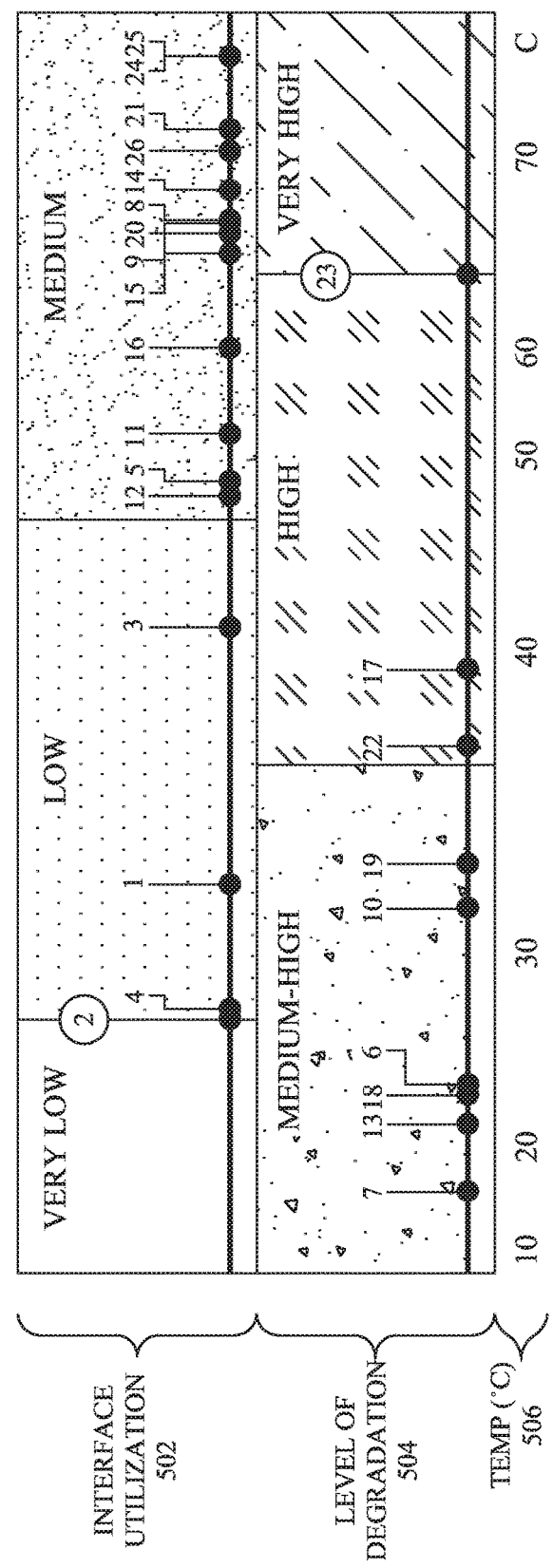
FIG. 5 illustrates an example of display data showing the relationship between interface temperature and utilization.

More generalized reporting to a user interface. For example, FIG. 5 illustrates an example of display data 500 showing the relationship between interface temperature and utilization, as well as the predicted impacts. Such a display will allow a user to make better decisions about the configuration of the network. For example, if the interface utilization 502 is 'medium' and the temperature 506 falls within the 'high' or 'very-high' range, this is likely to result in a much higher level of degradation 504, meaning that corrective measures should be taken.

Referring again to FIG. 3, output 314 may also comprise a control command that automatically initiates a corrective action in the network, in further embodiments. For example, in many network deployments, there are typically multiple redundant paths between switches, for purposes of redundancy and/or load sharing. This is typically provided by mechanisms such as Equal-Cost-Multipath (ECMP), in the case of routed traffic. Similarly, for switched traffic, a similar approach can be leveraged via Layer 2 Multipath (L2MP). Accordingly, when summarizer 308 raises a major alarm due to the impact associated with one or more transceivers, output 314 may include information that causes the affected devices to make local, optimized decisions, to alleviate this condition.

By way of example, in response to output 314, a receiving switch or router may evaluate the set of paths that are reachable via the affected transceiver/interface. In turn, if there are other ECMP paths to reach the same destination(s), the switch or router can reprogram the adjacencies or next-hop entries in a weighted manner so as to reduce the amount of traffic that will get hashed to the next-hops reachable via the interface in question. In this way, in some sense, this becomes a weighted cost multipath option, but the impact on the network forwarding will be minimal. Clearly, if there are no alternate paths, or the alternate paths are near saturation, such an approach will not provide any benefits and an alarm is the best that one could do.

In a further embodiment, a more optimized option can be to provide output 314 to a controller or other central entity (e.g., a service) that has information regarding the entire network including its routing and forwarding state. The controller can then make a more optimized decision that may require reprogramming entries across multiple switches thereby diverting the traffic along alternate paths. This will be a more optimal choice as opposed to the greedy approach mentioned earlier when the switch makes a local/greedy decision.

Figure 6:
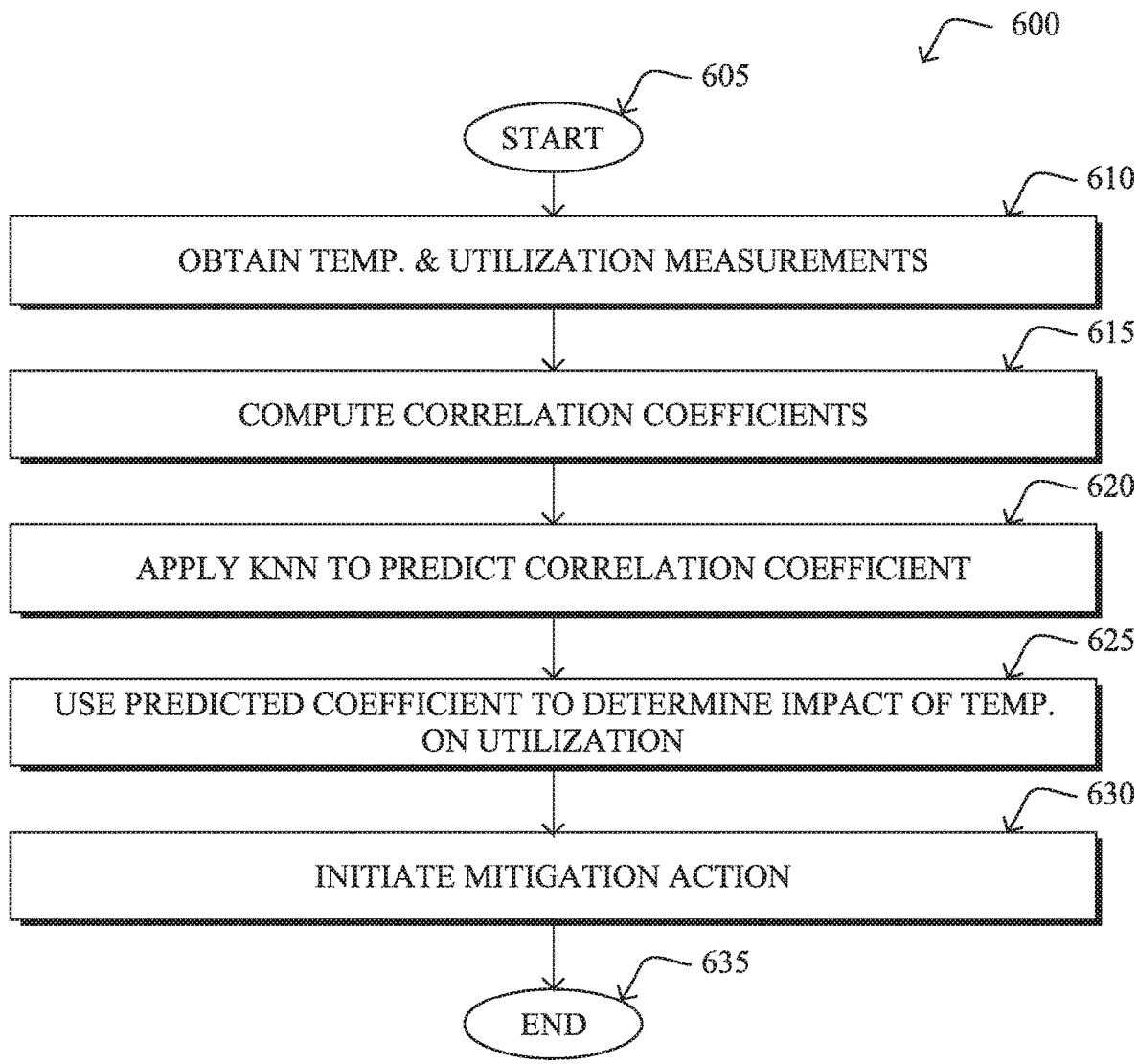
FIG. 6 illustrates an example simplified procedure for evaluating the impact of transceiver temperature on interface utilization.

FIG. 6 illustrates an example simplified procedure for evaluating the impact of transceiver temperature on interface utilization, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may obtain temperature and utilization measurements for a set of networking interface transceivers in a network. For example, the device may obtain these measurements for the various routers and/or switches within a given datacenter or other computing environment.

At step 615, as detailed above, the device may compute correlation coefficients, for each of the network interface transceivers, between its temperature and utilization measurements. For example, in some cases, the device may compute Pearson's correlation coefficients. Of course, other suitable correlation coefficients can also be used, instead.

At step 620, the device may apply a k-nearest neighbor classifier to the correlation coefficients, to predict a correlation coefficient, as described in greater detail above. In effect, such a predicted coefficient may be an average of the coefficients of the k-number of most similar transceivers in the set. In a further embodiment, such a classifier may also take into account the makes and/or models of the transceivers, to cluster like transceivers.

At step 625, as detailed above, the device may use the predicted correlation coefficient to determine an impact of temperature on utilization of a particular network interface transceiver. For example, if the predicted correlation coefficient is high, this may indicate that temperature has a high impact on the utilization for the corresponding transceivers. Note that this impact analysis may be separate from any temperature thresholding used in the network. For example, the temperature of a given optical interface may have a high impact on its utilization, even if the interface is still within its normal temperature operating range.

At step 630, the device may initiate a mitigation action, when the determined impact of temperature on the utilization of the particular network interface transceiver exceeds a predefined threshold, as described in greater detail. Such a mitigation action may, in some cases, entail sending an alert regarding the determined impact to a user interface for review. In further embodiments, the mitigation action may entail causing automatic changes to be made to the network, such as moving traffic away from the particular interface transceiver. For example, the device may send data regarding the impact to a switch or router, causing the router or switch to use ECMP signaling to reprogram adjacencies or next-hop entries in the network, to reduce an amount of traffic hashed to next-hops reachable via the particular interface transceiver. In further cases, the device may instead send data regarding the impact to a central network controller, to instead adjust the traffic in the network. Procedure 600 then ends at step 635.

It should be noted that while certain steps within procedures 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the analysis of the impact of temperature on utilization of a network interface's transceiver, such as an optical transceiver. Such an assessment allows for the performance of mitigation actions.

While there have been shown and described illustrative embodiments that provide for the analysis of network interface transceivers, it is to be understood that various other adaptations and modifications may be made within the spirit and scope of the embodiments herein. For example, while certain embodiments are described herein with respect to using certain models for purposes of assessing the impact of temperature on transceiver utilization, the models are not limited as such and may be used for other functions, in other embodiments. In addition, while certain protocols are shown, such as ECMP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a device, temperature and utilization measurements for a set of network interface transceivers in a network, wherein each of the utilization measurements is indicative of a number of bytes transmitted or received by a network interface transceiver during a given time period of a plurality of time periods, and each of the temperature measurements is indicative of a temperature of the network interface transceiver during a given time period of the plurality of time periods;
    determining, by the device, a correlation between the temperature measurements and the utilization measurements over the plurality of time periods by computing, for each of the network interface transceivers, respectively, a correlation coefficient between its temperature and utilization measurements;
    applying, by the device, a k-nearest neighbor classifier to the correlation coefficients, to predict a correlation coefficient that is an average of the correlation coefficients of k-number of most similar network interface transceivers in the set of network interface transceivers;
    using, by the device, the predicted correlation coefficient to determine an impact of temperature on utilization of a particular network interface transceiver; and
    initiating, by the device, a mitigation action, when the determined impact of temperature on the utilization of the particular network interface transceiver exceeds a predefined threshold.

2. The method as in claim 1, wherein initiating the mitigation action comprises:
    sending, by the device, an alert regarding the determined impact to a user interface for review.

3. The method as in claim 1, wherein initiating the mitigation action comprises:
    sending, by the device, data regarding the determined impact to a network controller in the network, to cause traffic in the network to be moved away from the particular interface transceiver.

4. The method as in claim 3, wherein the router or switch uses Equal Cost Multipath (ECMP) signaling to reprogram adjacencies or next-hop entries in the network, to reduce an amount of traffic hashed to next-hops reachable via the particular interface transceiver.

5. The method as in claim 1, wherein initiating the mitigation action comprises:
    sending, by the device, data regarding the determined impact to a router or switch, to cause traffic in the network to be moved away from the particular interface transceiver.

6. The method as in claim 1, wherein the temperature of the particular interface transceiver is within a normal operating temperature range.

7. The method as in claim 1, wherein the interface transceivers comprise optical transceivers.

8. An apparatus, comprising:
    one or more network interfaces to communicate with one or more networks;
    a processor coupled to the network interfaces and configured to execute one or more processes; and
    a memory configured to store a process executable by the processor, the process when executed configured to:
        obtain temperature and utilization measurements for a set of network interface transceivers in a network, wherein each of the utilization measurements is indicative of a number of bytes transmitted or received by a network interface transceiver during a given time period of a plurality of time periods, and each of the temperature measurements is indicative of a temperature of the network interface transceiver during a given time period of the plurality of time periods;
        determine a correlation between the temperature measurements and the utilization measurements over the plurality of time periods by computing, for each of the network interface transceivers, respectively, a correlation coefficient between its temperature and utilization measurements;
        apply a k-nearest neighbor classifier to the correlation coefficients, to predict a correlation coefficient that is an average of the correlation coefficients of k-number of most similar network interface transceivers in the set of network interface transceivers;
        use the predicted correlation coefficient to determine an impact of temperature on utilization of a particular network interface transceiver; and
        initiate a mitigation action, when the determined impact of temperature on the utilization of the particular network interface transceiver exceeds a predefined threshold.

9. The apparatus as in claim 8, wherein the apparatus initiates the mitigation action by:
    sending an alert regarding the determined impact to a user interface for review.

10. The apparatus as in claim 8, wherein the apparatus initiates the mitigation action by:
    sending data regarding the determined impact to a network controller in the network, to cause traffic in the network to be moved away from the particular interface transceiver.

11. The apparatus as in claim 8, wherein the apparatus initiates the mitigation action by:
    sending data regarding the determined impact to a router or switch, to cause traffic in the network to be moved away from the particular interface transceiver.

12. The apparatus as in claim 11, wherein the router or switch uses Equal Cost Multipath (ECMP) signaling to reprogram adjacencies or next-hop entries in the network, to reduce an amount of traffic hashed to next-hops reachable via the particular interface transceiver.

13. The apparatus as in claim 8, wherein the temperature of the particular interface transceiver is within a normal operating temperature range.

14. The apparatus as in claim 8, wherein the interface transceivers comprise optical transceivers.

15. A tangible, non-transitory, computer-readable medium storing program instructions that cause a device to execute a process comprising:

obtaining, by the device, temperature and utilization measurements for a set of network interface transceivers in a network, wherein each of the utilization measurements is indicative of a number of bytes transmitted or received by a network interface transceiver during a given time period of a plurality of time periods, and each of the temperature measurements is indicative of a temperature of the network interface transceiver during a given time period of the plurality of time periods;

determining, by the device, a correlation between the temperature measurements and the utilization measurements over the plurality of time periods by computing, for each of the network interface transceivers, respectively, a correlation coefficient between its temperature and utilization measurements;

applying, by the device, a k-nearest neighbor classifier to the correlation coefficients, to predict a correlation coefficient that is an average of the correlation coefficients of k-number of most similar network interface transceivers in the set of network interface transceivers;

using, by the device, the predicted correlation coefficient to determine an impact of temperature on utilization of a particular network interface transceiver; and initiating, by the device, a mitigation action, when the determined impact of temperature on the utilization of the particular network interface transceiver exceeds a predefined threshold.

16. The computer-readable medium as in claim 15, wherein initiating the mitigation action comprises:

sending, by the device, an alert regarding the determined impact to a user interface for review.

17. The computer-readable medium as in claim 15, wherein initiating the mitigation action comprises:

sending, by the device, data regarding the determined impact to a network controller in the network, to cause traffic in the network to be moved away from the particular interface transceiver.

18. The computer-readable medium as in claim 15, wherein initiating the mitigation action comprises:

sending, by the device, data regarding the determined impact to a router or switch, to cause traffic in the network to be moved away from the particular interface transceiver.

19. The computer-readable medium as in claim 18, wherein the router or switch uses Equal Cost Multipath (ECMP) signaling to reprogram adjacencies or next-hop entries in the network, to reduce an amount of traffic hashed to next-hops reachable via the particular interface transceiver.

20. The computer-readable medium as in claim 15, wherein the temperature of the particular interface transceiver is within a normal operating temperature range.

* * * * *

UNITED STATES PATENT AND TRADEMARK OFFICE
CERTIFICATE OF CORRECTION

PATENT NO.       : 11,128,541 B2
APPLICATION NO.  : 16/517742
DATED            : September 21, 2021
INVENTOR(S)      : Srinivas Siva Kanth Sattiraju et al.

It is certified that error appears in the above-identified patent and that said Letters Patent is hereby corrected as shown below:

In the Specification

Column 9, Line 29, please amend as shown:
stormSupressedPkts

Column 10, Line 50, please amend as shown:
where cov is the covariance, σX is the standard deviation of Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*